Patented Feb. 25, 1930

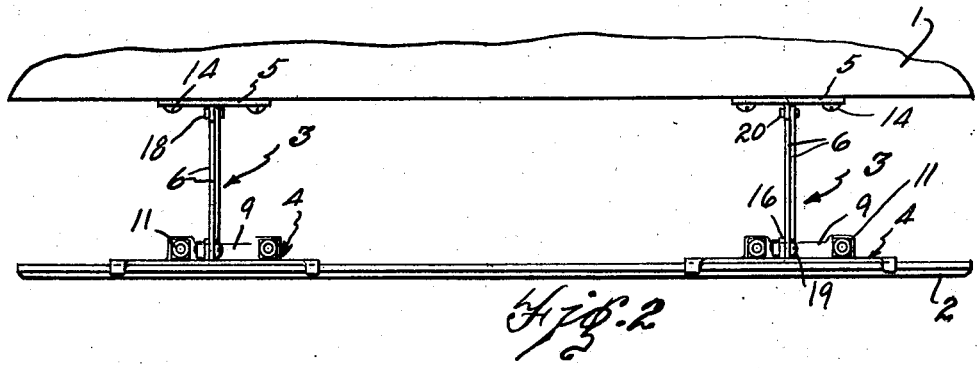
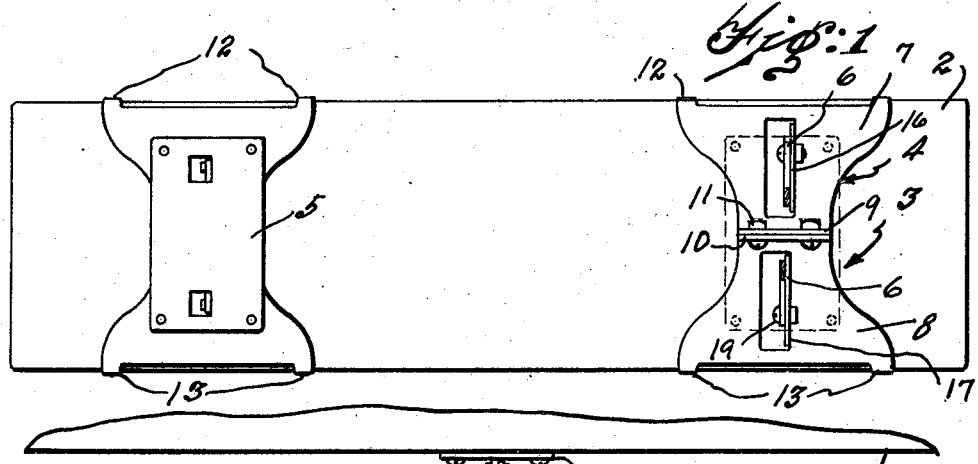
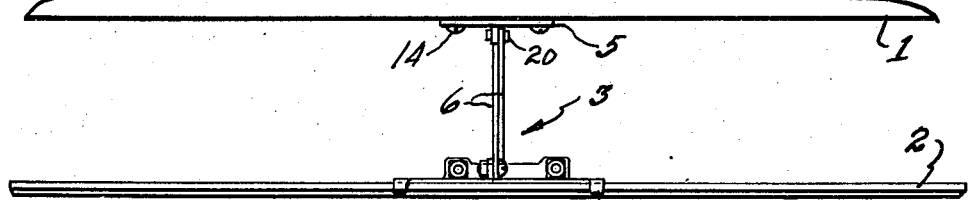
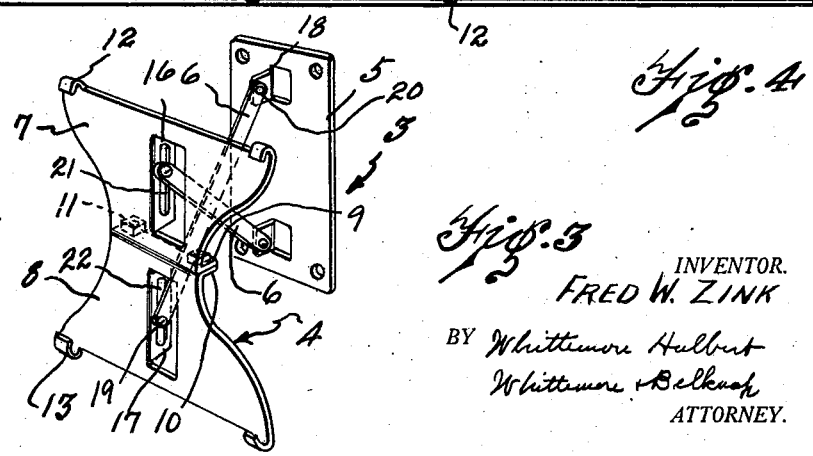

1,748,691

UNITED STATES PATENT OFFICE

FRED W. ZINK, OF DETROIT, MICHIGAN, ASSIGNOR TO KALES STAMPING COMPANY, OF DETROIT, MICHIGAN, A CORPORATION OF MICHIGAN

MIRROR MOUNTING

Application filed August 23, 1926. Serial No. 131,024.

This invention relates generally to brackets for supporting rear view mirrors upon windshield frames of motor vehicles and consists of certain novel features of construction, combinations and arrangements of parts as will be more fully described and particularly pointed out in the appended claims.

In the accompanying drawings:

Figure 1 is a rear elevation of a mirror supported by brackets embodying my invention upon the windshield header of a vehicle body.

Figure 2 is a top plan view thereof.

Figure 3 is a detail perspective view of one of the supporting brackets.

Figure 4 is a view similar to Figure 2 with only one supporting bracket employed.

Referring now to the drawing, 1 is a windshield header of a vehicle body, 2 is a mirror, and 3, 3 are brackets for supporting a mirror on said header. As shown, each bracket consists of a holder 4, an attaching plate 5, and a pair of crossed links 6. To provide an efficient construction, the holder 4 is preferably formed of two sheet metal parts or sections 7 and 8 respectively that are clamped upon the back of the mirror. As shown, these sections 7 and 8 are provided at their inner ends with lateral flanges 9 and 10 respectively that are connected together by bolts 11, and are provided at their outer ends with open return-bent flanges 12 and 13 respectively for receiving the edges of the mirror. Thus, by adjusting the bolts 11 the mirror 2 may be easily and quickly gripped or released by the flanges 12 and 13.

The attaching plate 5 is preferably elongated in form and is detachably secured by means of the screws 14 to the rear face of the header 1, while the crossed links 6 are preferably terminally secured to laterally extending lugs 16, 17 and 18 respectively on the holder 4 and attaching plate 5. As shown, the lugs 16 and 17 are struck out from the sections 7 and 8 respectively of the holder and are detachably connected by means of bolts 19 to the adjacent rear ends of the links 6, while the lugs 18 are struck out from the attaching plate 5 and are permanently secured by means of suitable rivets 20 to the adjacent forward ends of the links 6. Preferably the lugs 16 and 17 extend longitudinally of the holder and are provided with elongated slots 21 and 22 respectively to permit the bolts 19 to travel transversely of the mirror.

Thus, the connections between the holders 4 and attaching plates 5 permit longitudinal and transverse inclinations of the mirror relative to the header 1. For instance the crossed links 6 at one end of the mirror may be collapsed by pressing one end of the mirror toward the header, or the mirror may be tilted about the horizontal pivots 19 as desired. In fact the mirror may be tilted about the pivots 19 irrespective of whether either or both sets of crossed links are open or are partially or fully collapsed. Likewise either or both sets of crossed links may be collapsed or moved to open position irrespective of the angle of the mirror with respect to the header. Hence a full and clear vision may be readily obtained of the road in rear and at either side of the vehicle in which the mirror is mounted.

If desired, one of the brackets 3 may be dispensed with entirely, and the central portion of the mirror may be gripped by the holder 4 of a single bracket. (See Fig. 4.) As a matter of fact any number of brackets such as those shown and described may be used to support mirrors of various sizes and configurations.

While it is believed that from the foregoing description, the nature and advantage of my invention will be readily apparent, I desire to have it understood that I do not limit myself to what is herein shown and described and that such changes may be resorted to when desired as fall within the scope of what is claimed.

What I claim as my invention is:

1. The combination with a mirror and means for mounting said mirror upon a support including a holder for the mirror having laterally projecting lugs, an attaching plate having laterally projecting lugs, a pair of links freely crossing each other and extending between said holder and plate, a pivotal connection between said links and the lugs on said attaching plate, and a slot and pin connection between the links and the lugs on said holder.

2. A mirror mounting including a mirror holder having vertically spaced lugs projecting rearwardly therefrom, an attaching plate in rear of said holder and having vertically spaced lugs projecting forwardly therefrom, and a pair of freely crossed links between said holder and plate pivotally connected to the lugs on said plate and having a sliding and pivotal connection with the lugs on said holder whereby said holder may be moved vertically relative to said links.

3. A mirror mounting including a mirror holder having lugs projecting rearwardly therefrom, an attaching plate in rear of said holder and having lugs projecting forwardly therefrom, a pair of freely crossed links between said holder and plate, a pivotal connection between said links and the lugs on said plate, and a slot and pin connection between the links and the lugs on said holder.

4. A mirror mounting including laterally spaced mirror holders, laterally spaced attaching plates in rear of said holders respectively, two pairs of freely crossed links, one pair between each holder and plate, said links being pivotally connected to said plates respectively and pivotally and slidably connected to said holders.

5. A mirror mounting including a mirror holder, an attaching plate, and a pair of freely crossed links pivotally connected directly to portions of said plate and pivotally and slidably connected directly to portions of said holder.

6. A mirror mounting including a mirror holder, an attaching plate, lugs projecting from said holder, lugs projecting from said attaching plate, the lugs on said holder having elongated slots therein, and the lugs on said attaching plate having circular openings therein, a pair of freely crossed links, pins engaging the circular openings in the lugs on said attaching plate and pivotally connecting said links thereto, and pins slidable in the slots in the lugs on said holder and pivotally and slidably connecting the links thereto.

7. A mirror mounting including a mirror holder, an attaching plate, lugs projecting in opposite directions from said holder and plate respectively having circular openings and elongated slots therein, a pair of freely crossed links, and connections between said crossed links, and said mirror holder and attaching plate including elements extending through said links and received in said circular openings, and elements projecting from said links and received in said slots.

In testimony whereof I affix my signature.

FRED W. ZINK.